United States Patent
Belwal et al.

(10) Patent No.: US 12,470,925 B2
(45) Date of Patent: Nov. 11, 2025

(54) MULTI-LAYERED AUTHENTICATION NOTIFICATION SYSTEM FOR MOBILE DEVICES

(71) Applicant: T-Mobile USA, Inc., Bellevue, WA (US)

(72) Inventors: Deepesh Belwal, Ashburn, VA (US); Anuj Sharma, Ashburn, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 106 days.

(21) Appl. No.: 18/435,789

(22) Filed: Feb. 7, 2024

(65) Prior Publication Data
US 2025/0254523 A1  Aug. 7, 2025

(51) Int. Cl.
| | |
|---|---|
| H04W 12/02 | (2009.01) |
| H04W 12/06 | (2021.01) |
| H04W 12/30 | (2021.01) |

(52) U.S. Cl.
CPC ......... *H04W 12/068* (2021.01); *H04W 12/30* (2021.01)

(58) Field of Classification Search
CPC .... H04W 12/068; H04W 12/30; H04W 12/37
See application file for complete search history.

(56) References Cited

U.S. PATENT DOCUMENTS

| | | |
|---|---|---|
| 7,050,792 B2 | 5/2006 | Chou et al. |
| 7,532,890 B2 | 5/2009 | Davies et al. |
| 7,849,135 B2 | 12/2010 | Agrawal et al. |
| 7,890,427 B1 | 2/2011 | Rao et al. |
| 8,428,604 B2 | 4/2013 | Davies et al. |
| 8,457,661 B2 | 6/2013 | Rossano et al. |
| 8,467,817 B2 | 6/2013 | Said et al. |
| 9,241,270 B1* | 1/2016 | Logue ..................... G06F 21/44 |
| 9,374,370 B1* | 6/2016 | Bent, II .............. H04W 12/068 |
| 9,560,629 B2 | 1/2017 | Migicovsky et al. |
| 9,569,426 B1 | 2/2017 | Bostick et al. |
| 9,615,259 B2 | 4/2017 | Barkie et al. |
| 9,635,554 B2 | 4/2017 | Pender |
| 9,648,013 B2 | 5/2017 | Huxham et al. |
| 9,692,752 B2 | 6/2017 | Keys |
| 9,740,740 B1 | 8/2017 | Jett et al. |
| 9,787,624 B2 | 10/2017 | Gunnewiek et al. |

(Continued)

FOREIGN PATENT DOCUMENTS

| | | |
|---|---|---|
| CN | 105335066 A | 2/2016 |
| CN | 107637055 A | 1/2018 |

(Continued)

*Primary Examiner* — Ponnoreay Pich
(74) *Attorney, Agent, or Firm* — Perkins Coie LLP

(57) ABSTRACT

The technology relates to secure management of notifications on mobile devices. The method involves receiving messages over a telecommunications network. In instances where the mobile device is in an unlocked state, the user interface of the mobile device displays the message content through notifications on the user interface. The process includes determining the unlocked state of the mobile device and assessing whether the message contains sensitive content. Upon such determination, the mobile device performs a security process, which includes preventing showing the sensitive content in the notification until the user is authenticated. Upon successful authentication, the mobile device presents the content of the notification on the user interface.

20 Claims, 6 Drawing Sheets

(56) References Cited

U.S. PATENT DOCUMENTS

| | | |
|---|---|---|
| 9,788,146 B2 | 10/2017 | Kosseifi et al. |
| 9,900,777 B2 * | 2/2018 | Jones .................... H04W 8/18 |
| 10,630,630 B1 * | 4/2020 | Khawand .......... H04M 1/72448 |
| 11,321,742 B2 | 5/2022 | Cassidy et al. |
| 2006/0195506 A1 | 8/2006 | Deng |
| 2006/0224681 A1 | 10/2006 | Wurster |
| 2010/0146384 A1 * | 6/2010 | Peev ....................... G06F 9/451 |
| | | 715/255 |
| 2010/0146437 A1 | 6/2010 | Woodcock et al. |
| 2012/0117507 A1 | 5/2012 | Tseng et al. |
| 2012/0173635 A1 | 7/2012 | Wormald et al. |
| 2012/0274977 A1 | 11/2012 | Deroller |
| 2014/0187207 A1 * | 7/2014 | Slack .................... H04W 8/245 |
| | | 455/411 |
| 2015/0356289 A1 * | 12/2015 | Brown .................... G06F 21/35 |
| | | 726/7 |
| 2022/0129904 A1 * | 4/2022 | Gerling-Ospina ... G06Q 20/354 |
| 2023/0096899 A1 * | 3/2023 | Smith-Rose ........ H04L 63/1416 |
| | | 726/4 |

FOREIGN PATENT DOCUMENTS

| | | |
|---|---|---|
| CN | 112083994 A | 12/2020 |
| CN | 112187627 B | 10/2022 |
| EP | 2472837 A1 | 7/2012 |
| EP | 2913982 A1 | 9/2015 |
| EP | 3340670 B1 | 2/2020 |
| EP | 3868060 A1 | 8/2021 |
| JP | 2011516936 A | 5/2011 |
| JP | 6177781 B2 | 7/2017 |
| JP | 6423927 B2 | 10/2018 |
| JP | 7119098 B2 | 8/2022 |
| KR | 101459549 B1 | 11/2014 |
| KR | 101473471 B1 | 12/2014 |
| KR | 102398502 B1 | 5/2022 |
| WO | 2015073983 A2 | 5/2015 |
| WO | 2015149082 A2 | 10/2015 |
| WO | 2016200584 A2 | 12/2016 |
| WO | 2017003494 A1 | 1/2017 |
| WO | 2017027526 A1 | 2/2017 |
| WO | 2017218490 A1 | 12/2017 |
| WO | 2019045860 A1 | 3/2019 |
| WO | 2020081258 A1 | 4/2020 |

\* cited by examiner

MULTI-LAYERED AUTHENTICATION NOTIFICATION SYSTEM FOR MOBILE DEVICES

BACKGROUND

One-Time Passcodes (OTPs) are unique credentials to secure a specific transaction and/or login session. Typically, when a user initiates an action, such as a sensitive transaction (e.g., logging into an application or confirming a transaction), the authentication system generates a unique OTP and sends the OTP to the user's registered mobile device via a notification for verification purposes. OTPs oftentimes have a short-lived validity (e.g., such as only lasting for a few minutes) and are dynamically generated for heightened security. The generation process of OTPs often employs cryptographic hash functions or symmetric key algorithms, ensuring unpredictability and/or uniqueness for each code generated. The recipient is required to input the OTP within the specified timeframe to complete the authentication process successfully.

OTPs are commonly delivered to users through mobile device notifications, such as Short Message Services (SMS), mobile application push notifications, or dedicated authentication applications. Mobile device notifications operate as real-time alerts and information prompts delivered to users through various applications and systems. When an event triggers a notification, such as a new mobile application message or system alert, the server or application responsible generates a push notification. This push notification is then transmitted to the user's mobile device, prompting the device to graphically display the notification on the screen. The notification may serve as a brief message or icon, informing the user of the event or message without requiring the user to actively check the associated app.

BRIEF DESCRIPTION OF THE DRAWINGS

Detailed descriptions of implementations of the present technology will be described and explained through the use of the accompanying drawings.

Figure 1:
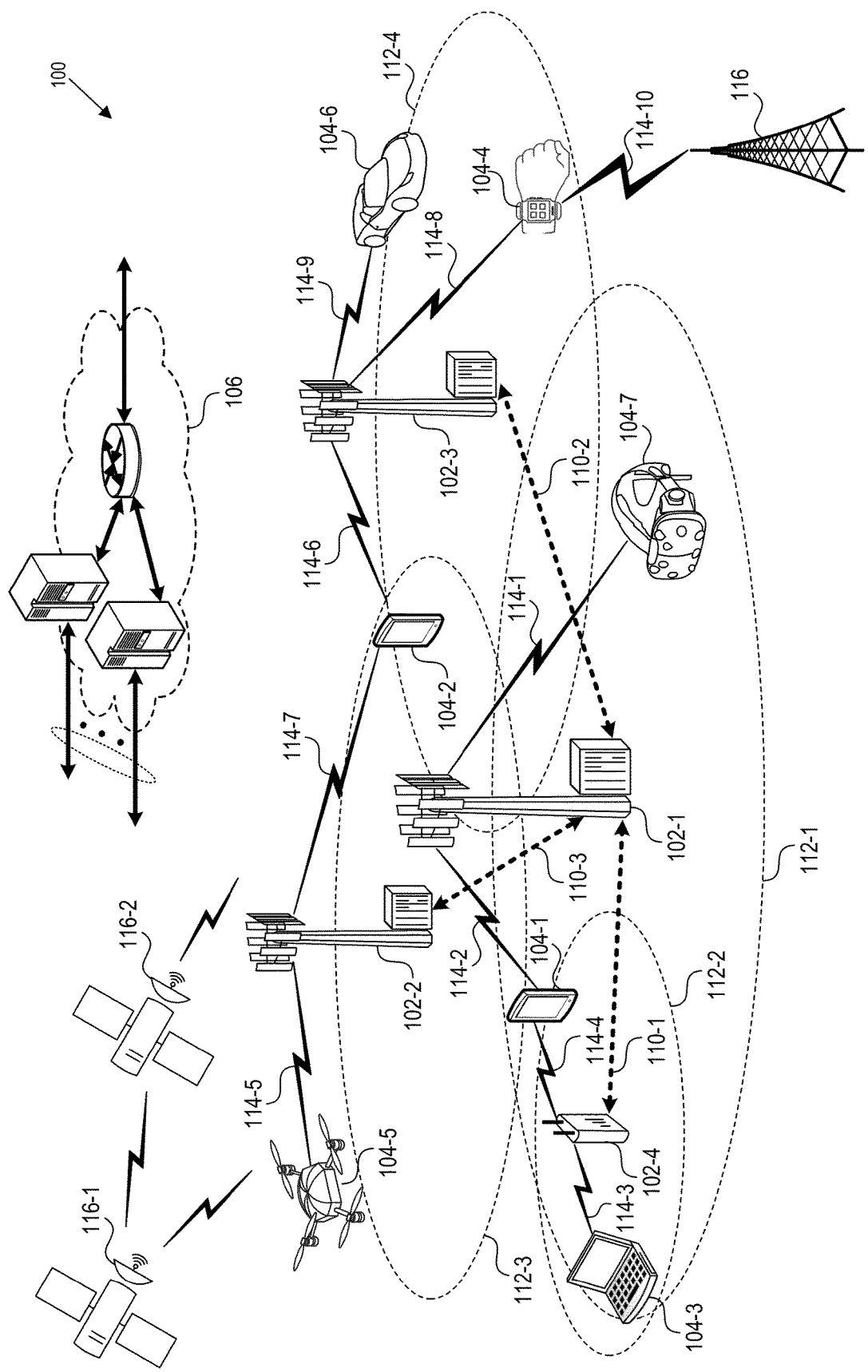
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to security measures for conditionally presenting push notifications on mobile devices when underlying messages contain sensitive data. An operating system on a mobile device, in some implementations, uses an Application Programming Interface (API) to interact with applications and other sources of messages that cause the mobile device to present notifications on the display of the mobile device. The operating system distinguishes between messages that include sensitive information and messages that do not contain sensitive information. The push notifications of messages that include sensitive information are presented in a way that obscures content that can be revealed once a target user of the message is authenticated.

In some implementations, a system designates certain applications into a secure notification list. When a push notification from these secured applications arrives at a mobile device, the notification triggers an additional layer of authentication, such as requiring a passcode, facial recognition, or fingerprint scanning, before revealing the content. The operating system, through an API that supports various authentication methods, facilitates the additional security measures for the applications on the device's secure notification list. The API can use an application's ID, notification details, and specified identification types, to determine whether the operating system requires enhanced security.

In some implementations, an additional layer of security is introduced through a dedicated application that discerns incoming notifications from secured applications and accordingly adjusts the application's privacy settings. Security measures include designating applications as private/non-private via the application, using indicators of the notification source for secure identification, and/or considering the content of the message. For example, for text messages containing sensitive information, a blocking mechanism may prevent them from appearing in notifications, with the application recognizing the content of the text messages as secure messages being delivered from an application on the secure notification list, which requires further verification within the application prior to viewing the content 216 of the notification.

The disclosed technology can address financial scams, often facilitated through mobile devices, that exploit users' good intentions. A prevalent social engineering scam involves gathering victim information, obtaining financial login details, and orchestrating scams with the help of unwitting individuals. Current security measures, such as one-time passcodes (OTPs), are susceptible to eavesdropping through scenarios where users unknowingly reveal this sensitive information. In the realm of mobile messaging and notifications, when a new message is generated, such as a message delivering the OTP, messages from mobile devices are directly delivered to the user's device and are initially displayed through push notifications.

For example, in a scenario where a user initiates a transaction on a banking application to transfer funds, upon confirming the transaction, the bank's server can dynamically generate an OTP (e.g., "748392") and send the OTP to the user's registered mobile device through a push notification. However, if the user's phone is already unlocked, the push notification containing the OTP directly appears on the device screen, providing immediate visibility and accessibility without the need to unlock the phone or navigate through applications. In a situation where the scammer already has possession of an unlocked phone (e.g., through faking the need to make a call), the scammer could then access the OTP to complete a fraudulent transaction.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Notification Security System

Figure 2A:
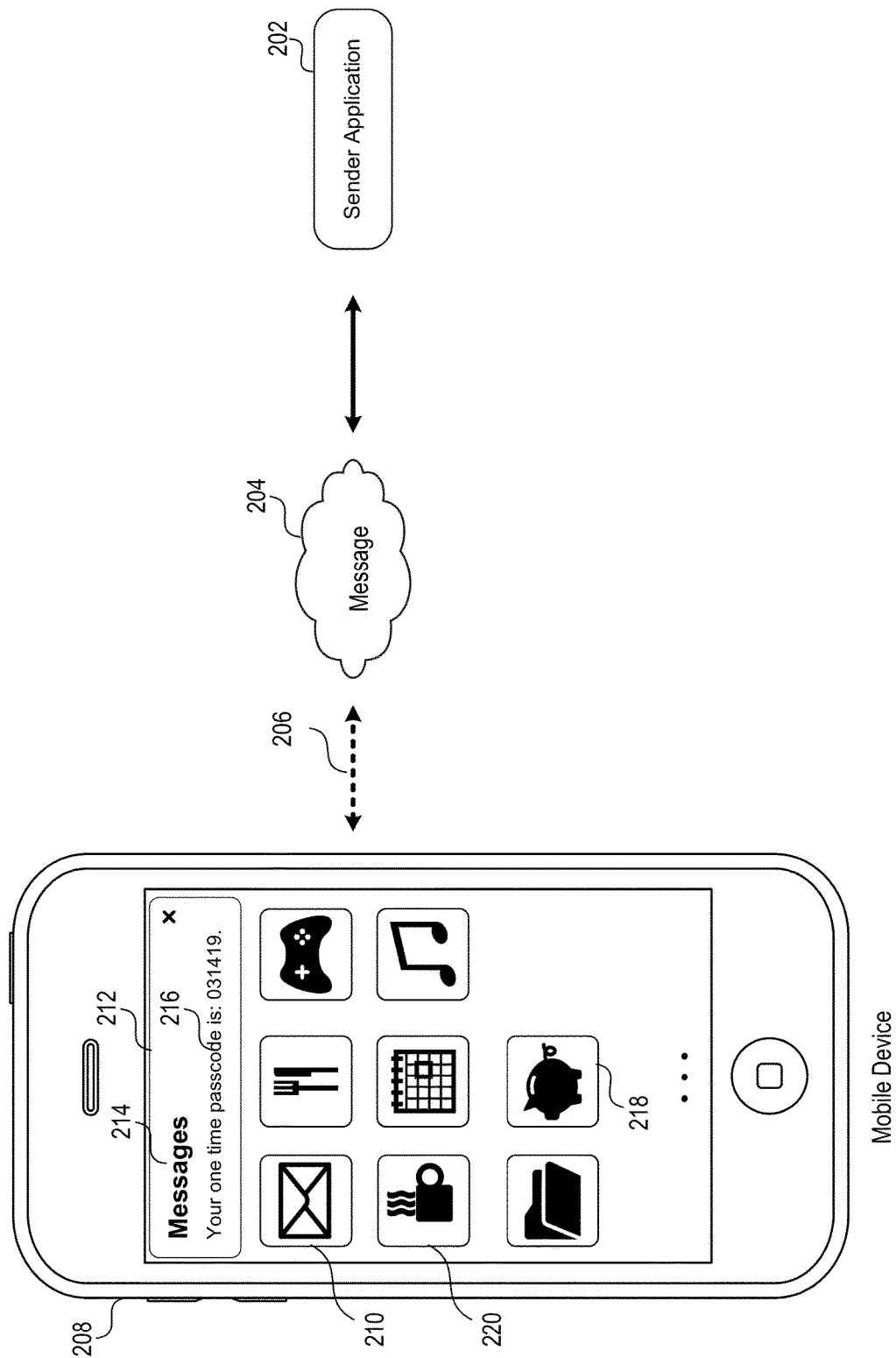
FIG. 2A is a block diagram that illustrates a prior art approach to receiving notifications containing sensitive information.

FIG. 2A is a block diagram that illustrates a prior art approach to receiving notifications containing sensitive information.

As shown in FIG. 2A, a sender application 202 transmits a message 204 over a telecommunications network 206, which is received by a mobile device 208. The mobile device 208 is in an unlocked state. The message 204 is sent from a notifying application 210. The notifying application 210 is located on the mobile device 208 (such as a mobile application), or separate from the sender application 202. For example, Bank of America (mobile or web application) (e.g., sender application 202) sends a message through the Messages mobile application (e.g., notifying application 210) to the user. Upon receiving the message 204, an exposed notification 212 is generated by the notifying application 210 with content 216 of the message 204. When the mobile device is in an unlocked state, the notification header 214 is displayed on the mobile device 208 without any authentication needed from the user. The mobile device 208 is able to contain various notifying applications 210. Applications 210 includes sensitive applications 218 (e.g., bank application) and non-sensitive applications 220 (e.g., coffee application). In the conventional setup shown, regardless of the sensitivity of the notifying applications 210, the content 216 of the message 204 is displayed to the user via exposed notification 212 without any further authentication. Presenting exposed notifications 212 from applications without distinguishing sensitive applications 218 and non-sensitive applications 220 potentially causes security risks associated with the inadvertent exposure of sensitive information.

Figure 2B:
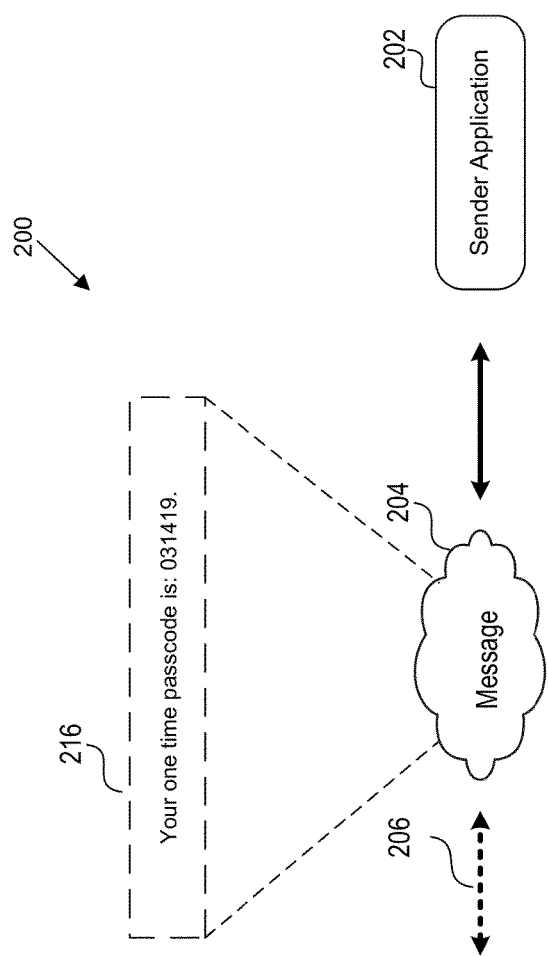
FIG. 2B is a block diagram that illustrates a notification security system for securing sensitive information by obscuring the message.
Figure 2B:
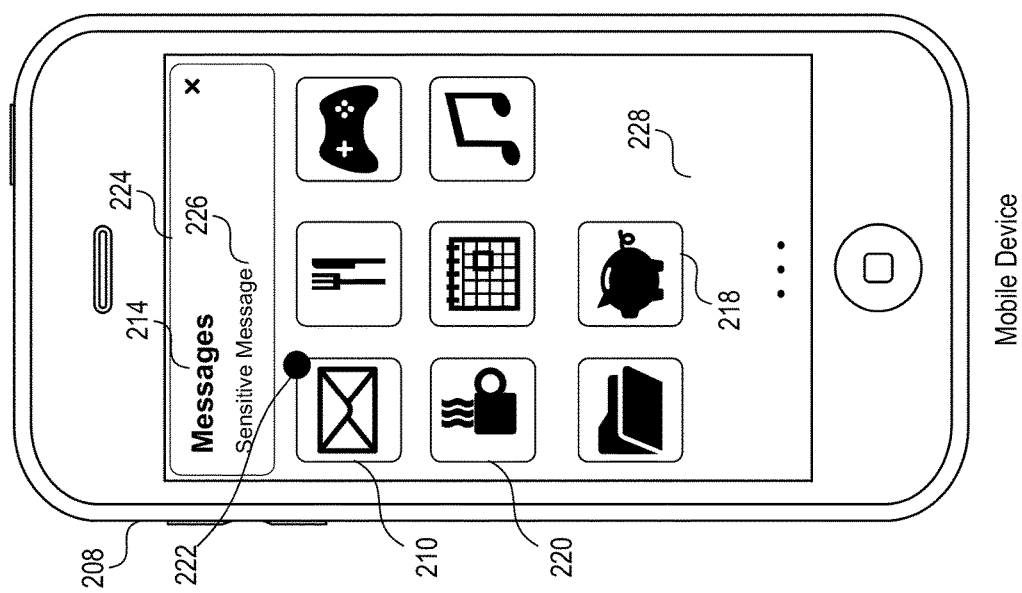

FIG. 2B is a block diagram that illustrates a notification security system 200 for securing sensitive information by obscuring the message.

To address the challenge described in connection with FIG. 2A, the disclosed technology provides a notification security system 200 as shown in FIG. 2B. Specifically, disclosed implementations implement enhanced notification security measures by distinguishing between sensitive information and non-sensitive information and taking additional security steps for sensitive information.

The notification security system 200 employs a sender application 202, a message 204, a telecommunications network 206, and a mobile device 208. A mobile device 208 receives messages 204 over a telecommunications network 206 (e.g., service provider associated with the network 100 in FIG. 1). In some implementations, the mobile device 208 is in an unlocked state.

In the context of mobile devices 208, the terms "locked" and "unlocked" refer to the operational states that dictate user access and interaction with the mobile device 208. When a mobile device 208 is in a "locked" state, in some implementations, the mobile device 208 is in a restricted mode that limits access to the functionalities (e.g., accessing mobile applications). Typically, a locked state is activated when the mobile device 208 is not actively in use or when a predefined period of inactivity occurs. In the locked state, users are, in some implementations, prompted to undergo an authentication process, which, in some implementations, requires the user to enter a passcode, draw a pattern, or use biometric authentication methods (such as fingerprint or facial recognition) to gain access to the mobile device 208 and resume full access of the mobile device 208. On the other hand, the "unlocked" state signifies that the mobile device is accessible and fully operational. Once the user successfully authenticates themselves, the device transitions from the locked state to the unlocked state, and allows access to applications, settings, and/or other mobile device 208 functionalities. The unlocked state is, in some implementations, a prerequisite for users to interact with the device, view notifications, and perform various tasks.

Transitioning between the locked and unlocked states involves, in some implementations, responsive mechanisms triggered by user actions or device conditions. For example, the mobile device 208 automatically transitions from an unlocked to a locked state after a specified period of inactivity or when the mobile device 208 is manually locked by the user. Conversely, user authentication, such as entering a PIN or using biometric methods, facilitates the transition of the mobile device 208 from a locked to an unlocked state.

In some implementations, the message 204 is sent to a notifying application 210. In some implementations, the notifying application 210 includes applications available on the mobile device 208 that present notifications on the mobile device 208 such as banking, restaurants, retail stores, grocery stores, gaming, music, emails, or any other type of mobile applications capable of communicating notifications. The notifying application 210, in some implementations, is capable of presenting notifications from applications other than itself (e.g., Messages application presenting a notification on behalf of a banking application).

In some implementations, the message 204 is sent from a sender application 202 that is different from the notifying application 210. For example, a web application for Bank of America (e.g., the sender application 202) sends a text message through the Messages application (e.g., the notifying application 210) on the user's mobile device to provide the user with the OTP needed to login to the user's bank account. In another example, the mobile application for Bank of America (e.g., the sender application 202), which is also on the user's mobile device 208, similarly sends a text message through the Messages application (e.g., the notifying application 210) on the user's mobile device 208 to provide the user with the OTP.

Upon receiving a message 204, the notification security system 200 intercepts the message 204 and dynamically assesses the sensitivity of the content 216 within the message 204. In some implementations, the content 216 of the received message 204 contains textual, multimedia (e.g., images, videos, audio), or other data. For example, text-based content 216, in some implementations, includes brief phrases, alerts, or informative snippets. Multimedia content 216, for example, involves images, graphics, or even audio-visual components. Content 216, in some implementations, carries specific information related to the source, purpose, and/or urgency of the message (e.g., transaction confirmations, social media updates, system alerts). In some implementations, a visual indicator 222 is presented to the user to indicate that the user has a notification from the notifying application 210.

In some implementations, a security API acts as an interface that interacts with various authentication methods supported by the mobile device's 208 operating system, such as face recognition, password/passcode, and/or fingerprint. The security API, in some implementations, is a tool that is employed by any application on the mobile device 208 to integrate secure notification features. The security API, in some implementations, is equipped with information such as the sending the application's (notifying application 210 or the sender application 202) identity and/or specifications regarding the type of authentication required to the mobile device 208. For example, the security API specifies that a certain message 204 notification necessitates face recognition authentication. In some implementations, the security API communicates to the operating system to withhold sending the notification to the user until the specified authentication process is successfully completed.

To assess the sensitivity of the content 216, in some implementations, the notifications security system 200 (through the security API, in some implementations) evaluates the content 216 against predefined criteria to ascertain whether the message contains sensitive information. The predefined criteria is a set of criteria designed to flag sensitive data. The predefined criteria, in some implementations, encompass factors such as keyword recognition, contextual analysis, and predefined patterns indicative of sensitive data. In some implementations, machine learning algorithms are employed to continuously refine sensitivity determination based on historical data and evolving patterns to improve sensitivity identification over time.

Keyword recognition algorithms, in some implementations, are employed in the predefined criteria to identify predefined sensitive keywords or phrases within the content. Predefined sensitive keywords may include terms such as "OTP," "one time passcode," "account number," "transaction ID," or "PIN." For example, the content is "Your one time passcode is: 031419," and "one time passcode" is a predefined sensitive keyword. The notification security system 200, in some implementations, recognizes that "one time passcode" is a predefined sensitive keyword, and subsequently flags the message 204 as containing sensitive content 216. In some implementations, keyword recognition differentiates keywords based upon a larger context of the content 216. For instance, if the message contains the phrase "account number," the system recognizes the importance of this term in the financial context (as opposed to "account number" in a less sensitive retail shopping context), and thus flags the content 216 as sensitive.

The keyword recognition algorithm, in some implementations, recognizes not only explicit keywords but also variations, synonyms, or contextually relevant terms that are potentially used to convey sensitive content, which maintains the detection accuracy of the algorithm in situations where subtle language variations are employed. For example, when a received message 204 contains the content "Electronic Health Records" (EHR) rather than "patient records," the algorithm recognizes the synonymous expression. If "patient records" is a predefined sensitive keyword, the notification security system 200 flags the message 204 as containing sensitive content 216. Keyword recognition, in some implementations, analyzes historical data, user interactions, and/or patterns to refine the notification security system's 200 understanding of what constitutes sensitive keywords and, likewise, synonyms of those sensitive keywords. The adaptability ensures that the notification security system 200 stays up to date with changes in language usage, emerging sensitivities, and evolving security threats.

Contextual analysis, in some implementations, is employed to consider sender application 202 and the recipient (e.g., notifying application 210) identities, message context, and associated metadata. The notification security system 200, in some implementations, considers the specific parties involved in the communication and recognizes that, in some implementations, the sensitivity of information is based on the identities of those sending and receiving the message 204, as opposed to the content 216 of the message 204. For example, a message 204 from a healthcare provider to a patient, in some implementations, inherently involves sensitive medical information and requires heightened security measures. Message context, in some implementations, is used to discern the significance of certain terms or phrases within the larger communication context. For example, the term "transfer" potentially has different implications in the context of a financial transaction (e.g., "You have received an incoming transfer of $70.99") versus a gaming microtransaction (e.g., "Player X transferred 1 dinosaur egg to you!"), and contextual analysis helps differentiate the nuances. Associated metadata, which includes additional information tied to the message, includes, in some implementations, details such as the timestamp, location of the sender, and/or any attachments present. By considering metadata elements, the notification security system 200 gains a more comprehensive understanding of the circumstances surrounding the message. For instance, a financial transaction confirmation may be more sensitive if the message occurs at an unusual time or location.

Pattern recognition techniques, in some implementations, are employed to identify structured patterns or encoding formats indicative of sensitive data. In some implementations, pattern recognition techniques involve searching for recurring patterns or encoding structures that may indicate the presence of confidential or private information. For instance, certain financial transactions follow a distinct pattern in terms of the arrangement of account numbers, amounts, and transaction codes (e.g., [User name], account [Account number], has a pending transaction for [Transaction amount]). Pattern recognition enables the system to identify and flag such structured sequences indicative of sensitive financial data. In addition to textual patterns, in some implementations, the notification security system 200 recognizes encoding formats commonly used to safeguard sensitive information. In some implementations, the formats include encrypted data and/or specific data formats employed by various industries.

In some implementations, the notification security system 200 uses aggregated criteria compliance to inspect the content 216. The quantification of criteria compliance involves the incorporation of fuzzy logic systems. Membership functions in fuzzy logic assign numerical values representing the degree of adherence to each criterion, offering a more nuanced, but still quantitative assessment. In some implementations, a fuzzy logic system delineates membership functions for each predefined criterion and establishes a rule base to govern the logical relationships between the content's 216 characteristics and compliance levels. Subsequently, the fuzzy inference engine is engaged to apply these defined rules and membership functions to the user input to generate fuzzy sets that represent the degrees of compliance for each criterion. An aggregation process follows, wherein the fuzzy values obtained for individual criteria are aggregated, considering the established rules and membership functions. A subsequent defuzzification step employs methods such as centroid or weighted average techniques to convert aggregated fuzzy values into numerical representations, which results in a quantitative assessment of compliance for each criterion. These individual compliance scores are then aggregated, providing an overall compliance level for the entire set of predefined criteria. If the overall compliance level is above a certain predefined threshold, the notification security system 200 determines that there is no sensitive content.

In the event that the content 216 of the message 204 is flagged as sensitive, a security process is initiated. Rather than directly presenting the content 216 within an notification (e.g., exposed notification 212), the system generates an obscured notification 224 that contains, in some implementations, obscured content 226. In some implementations, when the content 216 is obscured, the content 216 is rendered unreadable without proper authentication. In some implementations, the obscured content 226 contains a generic indication to the user that there is a message 204 (e.g., "Message") without showing the user who is the sending application or notifying application 210. In some implementations, the obscured content 226 contains an indication to inform the user that the message 204 is sensitive (e.g., "Sensitive Message"). In some implementations, obscuring the content 216 prevents the mobile device 208 from presenting any notification 224 to the user interface 228.

To access the obscured content 226, the user must undergo an authentication process. In some implementations, the authentication process involves verifying the user's identity through various means, such as biometric authentication, passcode entry, or other device-specific authentication protocols. Successful authentication, in some implementations, triggers the decryption of the obscured content 226, revealing the content 216 on the user interface of the mobile device. Failed authentication, in some implementations, keeps the content 216 obscured until the user successfully authenticates themselves on the mobile device 208.

Alternatively, in the event that the notification security system does not flag the content of a received message as sensitive, the user can readily see the content 216 of the message 204 without obscuring the content 216 through notification 212. The absence of sensitive content indicates, in some implementations, that the information is allowed to be readily presented within the notification 212 without the need for additional security measures. In such instances, the notification security system 200 does not generate obscured content 226, and directly presents the content 216 on the user interface 228 of the mobile device 208. Then, the user quickly receives the message 204 content 216 without undergoing an authentication process, streamlining the interaction for non-sensitive communications.

Figure 2C:
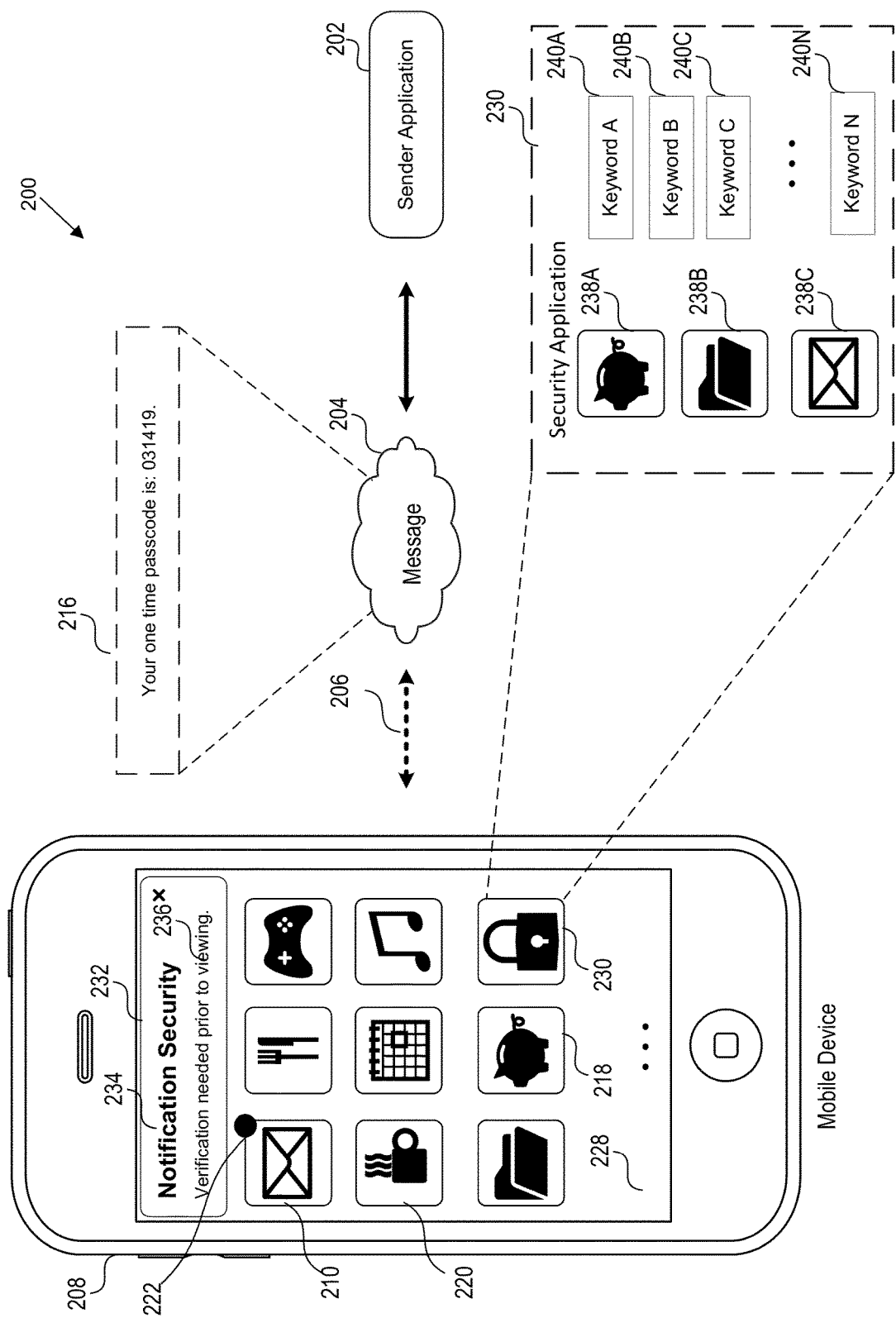
FIG. 2C is a block diagram that illustrates a notification security system for securing sensitive information by presenting a general alert.

FIG. 2C is a block diagram that illustrates a notification security system 200 for securing sensitive information by presenting a general alert.

The security application 230 acts as an intermediary layer that comprehends the context 216 of notifications and identifies whether the content 216 originates from a sender application 202 designated as private or sensitive. In some implementations, the security application 230 differentiates the sensitivity of the message 204 based on a user account by receiving user information through the secure notification API. For example, all messages 204 from a specific user account within the security application 230 are classified as private and subjected to additional security measures.

Upon intercepting a message 204, the security application 230 sends a general alert 232 to the user. In some implementations, the general alert 232 does not reveal any of the content 216 within the message 204. The general alert 232, in some implementations, notifies the user about the notifying application(s) 210 or sender application(s) 202 that triggered the general alert 232. In some implementations, the general alert 232 is conveyed via a notification display with the name 234 of the security application 230 graphically represented in the general alert 232. The general alert 232 provides a clear and immediate indication to the user about the sensitivity of the incoming message 204. Additionally, in some implementations, the general alert 232 contains alert content 236 to communicate to the user that additional authentication is required. For example, alert content 236 is "Verification needed prior to viewing." The alert content in the example does not reveal content 216, but does notify the user there is an incoming message 204 that is flagged as sensitive.

As further described in FIG. 2B, to assess the sensitivity of the content 216, in some implementations, the notifications security system 200 evaluates the content 216 against predefined criteria to ascertain whether the message contains sensitive information. The predefined criteria, in some implementations, include the predefined list of applications 238 and/or the predefined keywords 240.

In some implementations, users are able to edit and customize these predefined lists (e.g., removing and/or adding sender applications 202 or predefined keywords) due to changing preferences. In some implementations, users are allowed to designate certain sender applications 202 as sensitive or non-sensitive. The interaction between the user and the security application 230 triggers communication with the mobile device's 208 operating system API to provide information on the nature of the notification and the required authentication methods. For example, a user designates all notifications from a messaging application as sensitive, necessitating additional security measures.

In some implementations, the predefined criteria include a predefined list of applications (238A, 238B, and 238C) that are recognized as sensitive. In some implementations, the predefined list of applications 238 is notifying applications that are capable of presenting notifications. Examples of applications that are on the predefined sensitive list include financial apps, such as banking applications 238A, where transaction details and account information demand heightened security measures. User files 238B potentially contain confidential user records, and thus, in some implementations, are flagged as sensitive information. Furthermore, secure messaging applications or enterprise communication tools 238C are flagged as sensitive in some implementations due to the potential presence of confidential corporate communications. For instance, if a banking application 238A triggers a notification, the notification security system 200, in some implementations, automatically enacts additional security measures, such as requiring user authentication and/or presenting a general alert.

In some implementations, the predefined criteria include at least one predefined keyword, 240A, 240B, 240C, and so on through 240N, for a total of n keywords, where n equals the number of keywords. Examples of predefined keywords 240, in some implementations, encompass terms associated with financial transactions (e.g., "transaction," "account," or specific currency symbols like "$" or "€"), health-related information (e.g., "diagnosis," "prescription," or medical terminology), or sensitive corporate communication indicators (e.g., "confidential," "proprietary," or specific project names). For instance, recognizing phrases such as "Your one-time passcode is:" by recognizing that "passcode" is a predefined keyword prompts the system to classify the notification as secure and subject the notification to additional verification processes.

The predefined keywords 240 serve as linguistic markers indicative of sensitive content, enabling the security application 230 to recognize potential security concerns without relying solely on predefined lists of applications. When a message 204 is intercepted by the security application 230, the security application 230 automatically scans the content 216 for the presence of the predefined keywords 240. For instance, if the term "confidential" is one of the predefined keywords 240 and is detected within the content 216, the security application initiates additional security measures, such as obscuring the content (shown in FIG. 2B), showing a general alert (shown in FIG. 2C), and/or triggering an authentication process.

In some implementations, the predefined criteria in the security application 230 leverages short codes, which are specific to certain applications. The short codes serve as identifiers that help the security application 230 recognize the source of a notification and categorize it accordingly. For example, the text message sent from "77891," is mapped to a certain financial application. Additionally, in some implementations, the text message "Text FASHION to 72404 for the latest trends and offers" is analyzed by the security application 230 to extract the short code (e.g., "72402") and map the short code to the corresponding application.

Figure 3:
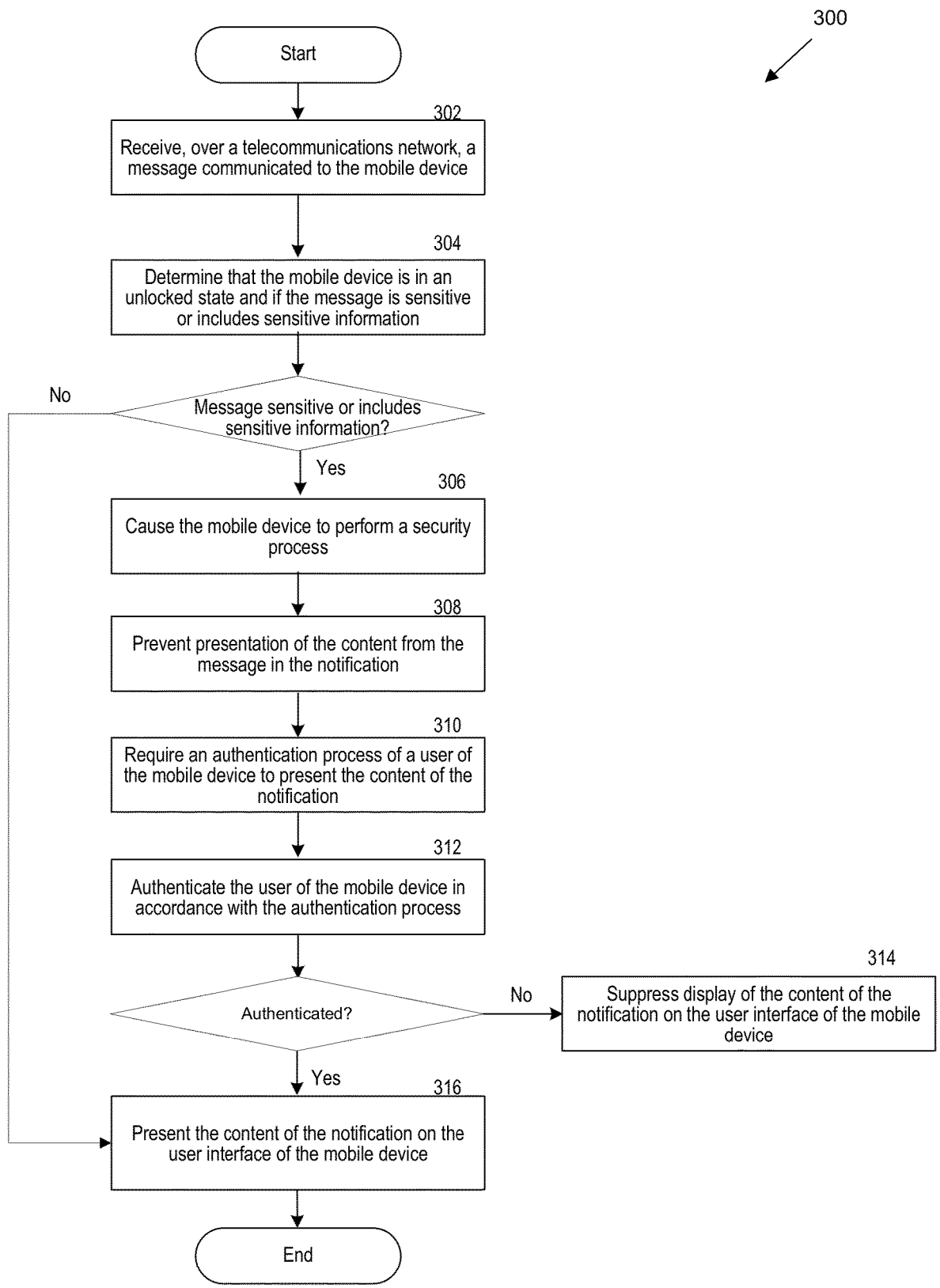
FIG. 3 is a flowchart that illustrates a process performed by a mobile device to dynamically secure notifications.

FIG. 3 is a flowchart that illustrates a process 300 performed by a mobile device. In one example, the process 300 is performed by a mobile device (e.g., the mobile device 208 in FIGS. 2B and 2C) to dynamically secure notifications of received messages. The process 300 can be performed by a system of a network operator of the telecommunications network (e.g., network 100). More specifically, one or more non-transitory, computer-readable storage media storing instructions recorded thereon that, when executed by at least one data processor of a system of a telecommunications network, cause the system to perform the process 300.

At 302, the mobile device receives, over a telecommunications network, a message communicated to the mobile device. In some implementations, the mobile device, when in an unlocked state (as described in FIG. 2B), is configured to present a content of the message through a notification of the message on a user interface of the mobile device. In some implementations, the notification is generated by an application (e.g., the application 210 in FIGS. 2B and 2C). In some implementations, the mobile device transitions from a locked state (as described in FIG. 2B) to an unlocked state in response to first detecting a user interaction via the mobile device. Then, the mobile device analyzes the user interaction, via the mobile device, to verify authenticity of the user interaction based on predefined criteria. In some implementations, the predefined criteria relate to standards determining a level of user access to the mobile device based on the detected user interaction. After that, the mobile device verifies the authenticity of the user interaction.

For example, the mobile device assesses the biometric data or other security process data associated with the user interaction, such as fingerprint or facial recognition. The predefined criteria can specify that, if the biometric data matches the authorized user's profile with a high confidence level, the user is granted unrestricted access to the device. On the other hand, if the biometric data verification falls below a certain threshold or indicates potential tampering, the predefined criteria can dictate a restricted level of access and limit the user's ability to view certain notifications or access certain applications.

At 304, the mobile device determines that the mobile device is in the unlocked state and that the message is sensitive or includes sensitive information. In some implementations, prior to determining that the message is sensitive or includes sensitive information process 300 includes calling an application programming interface (API) of an operating system on the mobile device to intercept the message, wherein the API causes the mobile device to perform the security process.

At 306, in response to the determination that the mobile device is in the unlocked state and that the message is sensitive or includes sensitive information, the mobile device is caused to perform a security process (e.g., assesses the sensitivity of the content 216). In some implementations, determining that the message is sensitive or includes sensitive information comprises verifying that an application receiving the message is designated as sensitive based on a predefined list of sensitive applications, and parsing the content of the message to identify the sensitive information based on predetermined sensitivity criteria.

In some implementations, determining that the message is sensitive or includes sensitive information is based on the application's identity. In some implementations, the predefined list of sensitive applications or predetermined criteria is editable via the user interface. For example, a user designates their banking application as sensitive. When the mobile device detects an unlocked state and receives a notification from this designated banking app, the security process is triggered. The mobile device checks the predefined list of sensitive applications. If the banking application is on the list, the notification is identified as sensitive and prompts the security measures.

At 308, the security process can include preventing the presentation of the content from the message in the notification. For example, preventing presentation of the content from the message in the notification can include obscuring the content of the notification presented on the user interface of the mobile device, preventing the mobile device from presenting the notification including the content, or displaying a generic alert (e.g., alert content 236) on the user interface of the mobile device, wherein the generic alert communicates a presence of the notification (e.g., "private message").

At 310, the security process can include requiring an authentication process of a user of the mobile device to present the content of the notification. The required authentication process can involve one or more methods such as biometric authentication (e.g., fingerprint or face recognition), a passcode entry, and/or other device-specific authentication protocols, discussed further in FIG. 2B.

At 312, the mobile device authenticates the user of the mobile device in accordance with the authentication process in step 310. In some implementations, the device prompts the user to authenticate themselves using the specified method. For example, the user may be prompted to provide their fingerprint or enter a passcode. In some embodiments, the mobile device verifies the provided authentication against the stored credentials associated with the user account.

At 314, in response to failing to authenticate the user of the mobile device in accordance with the authentication process, the mobile device, in some implementations, suppresses display of the content of the notification on the user interface of the mobile device. In some implementations, suppressing the display of the content includes obscuring the content, as further described in the obscured content 226 in FIG. 2B. In some implementations, suppressing the display of the content includes displaying a generic alert (e.g., alert content 236), as further described in FIG. 2C. In some implementations, the mobile device completely removes the notification from the user interface of the mobile device until the user successfully authenticates.

In some implementations, suppressing the display of the content includes a delay timer. The notification remains in a delayed state and is hidden from the user on the user interface. The mobile device can introduce a time delay, preventing the user from any reattempts of authentication for a predefined period. In some implementations, a visual indicator, such as an icon or color change, may persist on the user interface to signify that suppressed content awaits proper authentication. The mobile device, in some implementations, can emit specific audio cues or alerts to signal the failed authentication and the subsequent suppression of sensitive content.

At 316, in response to authenticating the user, the mobile device presents the content of the notification on the user interface of the mobile device. In some instances, in response to determining that the mobile device is in the unlocked state and that the second message is not sensitive or does not include sensitive information, the mobile device also presents the content of the notification on the user interface of the mobile device 316. For example, a weather application generates a notification with information about the current weather conditions. Since the message is not sensitive, the mobile device follows a standard notification presentation procedure. Then, the user can view the weather details directly on the user's device without undergoing any additional authentication or security processes. The user sees the weather information displayed on the user's device's screen without any additional security measures. The content is readily accessible since the content is not classified as sensitive.

Computer System

Figure 4:
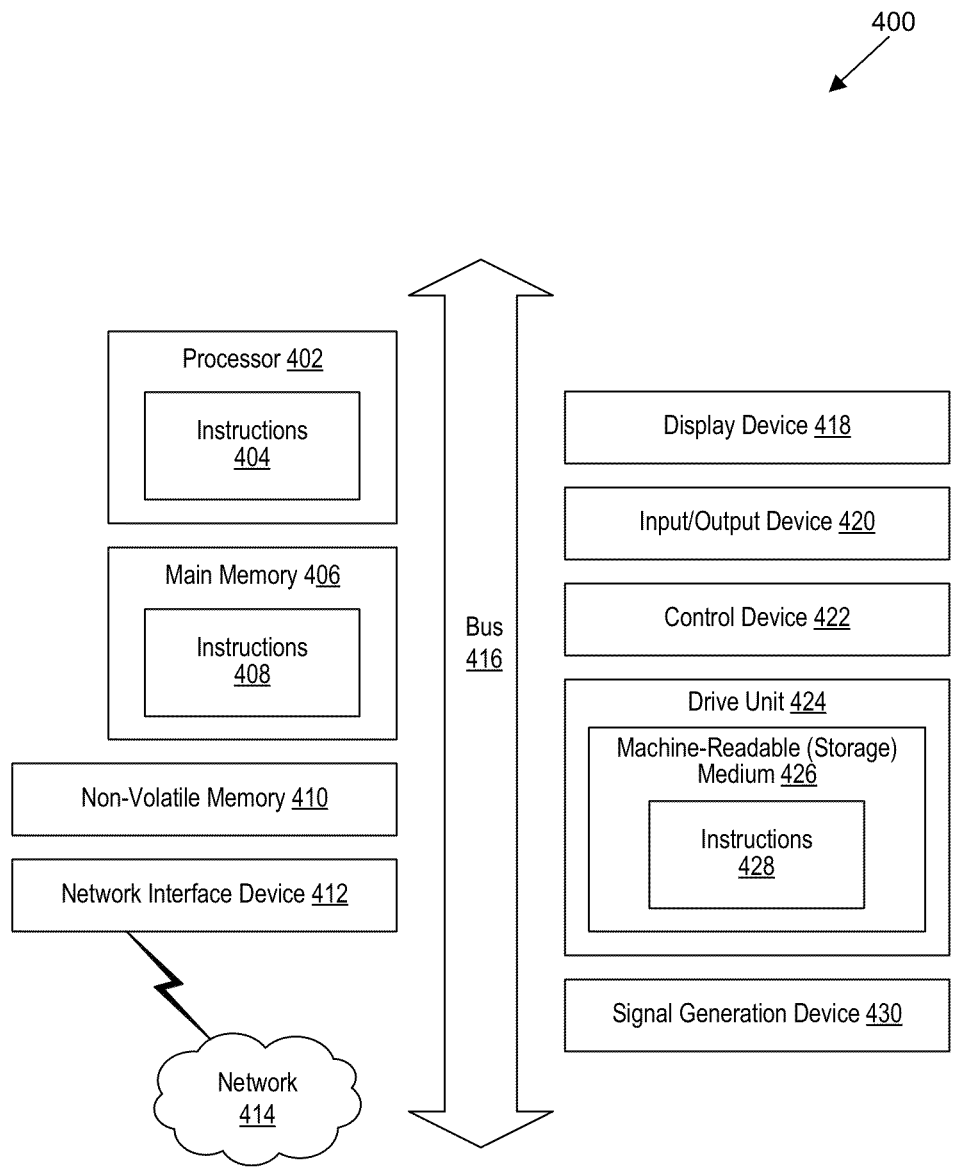
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, a video display device 418, an input/output device 420, a control device 422 (e.g., keyboard and pointing device), a drive unit 424 that includes a machine-readable (storage) medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementations, the computer system 400 can be an embedded computer system, a system-on-chip (SOC), a single-board computer system (SBC), or a distributed system such as a mesh of computer systems, or it can include one or more cloud components in one or more networks. Where appropriate, one or more computer systems 400 can perform operations in real time, in near real time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A method performed by a mobile device to dynamically secure notifications of received messages, the method comprising:
   receiving, over a telecommunications network, a message communicated to the mobile device,
      wherein the mobile device, when in an unlocked state, is configured to present a content of the message through a notification of the message on a user interface of the mobile device;
   determining that the mobile device is in the unlocked state and that the message is sensitive or includes sensitive information;
   in response to the determination that the mobile device is in the unlocked state and that the message is sensitive or includes sensitive information, causing the mobile device to perform a security process including:
      preventing presentation of the content from the message in the notification; and
      requiring an authentication process of a user of the mobile device to present the content of the notification;
   authenticating the user of the mobile device in accordance with the authentication process; and
   in response to authenticating the user, presenting the content of the notification on the user interface of the mobile device.

2. The method of claim 1, wherein preventing presentation of the content from the message in the notification comprises:
   obscuring the content of the notification presented on the user interface of the mobile device;
   preventing the mobile device from presenting the notification including the content; or
   displaying a generic alert on the user interface of the mobile device, wherein the generic alert communicates a presence of the notification.

3. The method of claim 1 further comprising, prior to determining that the message is sensitive or includes the sensitive information:
   calling an application programming interface (API) of an operating system on the mobile device to intercept the message,
      wherein the API causes the mobile device to perform the security process.

4. The method according to claim 1, wherein the message is a first message, the method further comprising:
   receiving a second message on the mobile device;
   determining that the mobile device is in the unlocked state and that the second message is sensitive or includes sensitive information;
   in response to the determination that the mobile device is in the unlocked state and that the second message is sensitive or includes sensitive information, causing the mobile device to perform a security process including:
      preventing presentation of the content from the second message in the notification; and
      requiring an authentication process of a user of the mobile device to present the content of the notification;
   failing to authenticate the user of the mobile device in accordance with the authentication process; and
   in response to failing to authenticate the user, suppressing display of the content of the notification on the user interface of the mobile device.

5. The method according to claim 1, wherein the message is a first message, the method further comprising:
   receiving a second message on the mobile device;
   determining that the mobile device is in the unlocked state and that the second message is not sensitive or does not include sensitive information; and
   in response to the determination that the mobile device is in the unlocked state and that the second message is not sensitive or does not include sensitive information, presenting the content of the notification on the user interface of the mobile device.

6. The method according to claim 1, wherein determining that the message is sensitive or includes sensitive information comprises:
   verifying that an application receiving the message is designated as sensitive based on a predefined list of sensitive applications; and
   parsing the content of the message to identify the sensitive information based on predetermined sensitivity criteria.

7. The method according to claim 6, wherein one or more of the predefined list of sensitive applications or predetermined criteria are editable via the user interface.

8. The method according to claim 1,
   wherein the notification is generated by an application, and
   wherein the determining that the message is sensitive or includes the sensitive information is based on the application's identity.

9. The method according to claim 1, wherein the mobile device transitions from a locked state to the unlocked state in response to:
   detecting a user interaction via the mobile device;
   analyzing the user interaction, via the mobile device, to verify authenticity of the user interaction based on predefined criteria,
      wherein the predefined criteria relate to standards determining a level of user access to the mobile device based on the detected user interaction; and
   verifying the authenticity of the user interaction.

10. A system for dynamically securing notifications of received messages, the system comprising:
    at least one hardware processor; and
    at least one non-transitory memory storing instructions, which, when executed by the at least one hardware processor, cause the system to:
       receive, over a telecommunications network, a message communicated to a mobile device, wherein the mobile device, when in an unlocked state, is configured to present a content of the message through a notification of the message on a user interface of the mobile device;
determine that the mobile device is in the unlocked state and that the message is sensitive or includes sensitive information;
in response to the determination that the mobile device is in the unlocked state and that the message is sensitive or includes the sensitive information, cause the mobile device to:
prevent presentation of the content from the message in the notification; and
require an authentication process of a user of the mobile device to present the content of the notification.

11. The system of claim 10, wherein the system is further caused to:
authenticate the user of the mobile device in accordance with the authentication process; and
in response to authenticating the user, presenting the content of the notification on the user interface of the mobile device.

12. The system of claim 10, wherein to prevent presentation of the content from the message in the notification comprises causing the system to:
obscure the content of the notification presented on the user interface of the mobile device;
prevent the mobile device from presenting the notification including the content; or
display a generic alert on the user interface of the mobile device, wherein the generic alert communicates a presence of the notification.

13. The system of claim 10, wherein the message is a first message, further caused to:
receive a second message on the mobile device;
determine that the mobile device is in the unlocked state and that the second message is sensitive or includes the sensitive information;
in response to the determination that the mobile device is in the unlocked state and that the second message is sensitive or includes the sensitive information, causing the mobile device to:
prevent presentation of the content from the second message in the notification; and
require an authentication process of a user of the mobile device to present the content of the notification;
fail to authenticate the user of the mobile device in accordance with the authentication process; and
in response to failing to authenticate the user, suppressing display of the content of the notification on the user interface of the mobile device.

14. The system of claim 10, wherein the message is a first message, further caused to:
receive a second message on the mobile device;
determine that the mobile device is in the unlocked state and that the second message is not sensitive or does not include the sensitive information; and
in response to the determination that the mobile device is in the unlocked state and that the second message is not sensitive or does not include the sensitive information, presenting the content of the notification on the user interface of the mobile device.

15. The system of claim 10, wherein determining that the message is sensitive or includes the sensitive information comprises causing the system to:

verify that an application receiving the message is designated as sensitive based on a predefined list of sensitive applications; and
parse the content of the message to identify the sensitive information based on predetermined sensitivity criteria.

16. A computer-readable storage medium, excluding transitory signals and carrying instructions, which, when executed by at least one data processor of a system, cause the system to:
receive, over a telecommunications network, a message communicated to a mobile device,
wherein the mobile device, when in an unlocked state, is configured to present a content of the message through a notification of the message on a user interface of the mobile device;
determine that the mobile device is in the unlocked state and that the message is sensitive or includes sensitive information;
in response to the determination that the mobile device is in the unlocked state and that the message is sensitive or includes the sensitive information, cause the mobile device to perform a security process including:
prevent presentation of the content from the message in the notification; and
require an authentication process of a user of the mobile device to present the content of the notification; and
authenticate the user of the mobile device in accordance with the authentication process; and
in response to authenticating the user, presenting the content of the notification on the user interface of the mobile device.

17. The computer-readable storage medium of claim 16, wherein to prevent presentation of the content from the message in the notification comprises:
obscuring the content of the notification presented on the user interface of the mobile device;
preventing the mobile device from presenting the notification including the content; or
displaying a generic alert on the user interface of the mobile device, wherein the generic alert communicates a presence of the notification.

18. The computer-readable storage medium of claim 16, wherein the message is a first message, further causing the system to:
receiving a second message on the mobile device;
determining that the mobile device is in the unlocked state and that the second message is sensitive or includes the sensitive information;
in response to the determination that the mobile device is in the unlocked state and that the second message is sensitive or includes the sensitive information, causing the mobile device to:
prevent presentation of the content from the second message in the notification; and
require an authentication process of a user of the mobile device to present the content of the notification;
failing to authenticate the user of the mobile device in accordance with the authentication process; and
in response to failing to authenticate the user, suppressing display of the content of the notification on the user interface of the mobile device.

19. The computer-readable storage medium of claim 16, wherein the message is a first message, the system being further caused to:
receiving a second message on the mobile device;

determining that the mobile device is in the unlocked state and that the second message is not sensitive or does not include the sensitive information; and in response to the determination that the mobile device is in the unlocked state and that the second message is not sensitive or does not include the sensitive information, presenting the content of the notification on the user interface of the mobile device.

20. The computer-readable storage medium of claim 16, wherein determining that the message is sensitive or includes the sensitive information, the system being further caused to:

verifying that an application receiving the message is designated as sensitive based on a predefined list of sensitive applications; and parsing the content of the message to identify the sensitive information based on predetermined sensitivity criteria.

\* \* \* \* \*